United States Patent
Hickman et al.

(10) Patent No.: US 6,226,786 B1
(45) Date of Patent: *May 1, 2001

(54) MINIMIZING DEBUG INFORMATION FOR GLOBAL TYPES IN COMPILED LANGUAGES

(75) Inventors: Kevin Paul Hickman, Coquitlam; Donald James McCrady, North York; William Sarantakos, Willowdale; Kevin Alexander Stoodley, Richmond Hill; Brian Ward Thomson, North York, all of (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,527

(22) Filed: Dec. 17, 1997

(30) Foreign Application Priority Data

Dec. 24, 1996 (CA) .................................................. 2194020

(51) Int. Cl.[7] ...................................................... G06F 9/45
(52) U.S. Cl. ............................................................. 717/4
(58) Field of Search ................................ 395/704; 717/4, 717/5, 6, 7

(56) References Cited

U.S. PATENT DOCUMENTS

| | | | |
|---|---|---|---|
| 5,361,350 | 11/1994 | Conner et al. | 707/103 |
| 5,367,683 | * 11/1994 | Brett | 717/9 |
| 5,408,665 | * 4/1995 | Fitzgerald | 717/10 |
| 5,421,016 | 5/1995 | Conner et al. | 717/7 |
| 5,446,900 | * 8/1995 | Kimelman | 717/4 |
| 5,493,680 | 2/1996 | Danforth | 717/2 |
| 5,560,009 | * 9/1996 | Lenkov et al. | 717/4 |
| 5,579,520 | * 11/1996 | Bennett | 717/4 |
| 5,692,195 | * 11/1997 | Conner et al. | 709/316 |
| 5,732,273 | * 3/1998 | Srivastava et al. | 717/4 |
| 5,771,385 | * 6/1998 | Harper | 717/4 |
| 5,815,714 | * 9/1998 | Shridhar et al. | 717/4 |
| 5,946,486 | * 8/1999 | Pekowski | 717/4 |
| 5,963,740 | * 10/1999 | Srivastava et al. | 717/4 |

FOREIGN PATENT DOCUMENTS

| | | | |
|---|---|---|---|
| 0777177 | 4/1997 | (GB) . | |
| 363189948 | * 8/1988 | (JP) | G06F/11/28 |
| 403019040 | * 1/1991 | (JP) | G06F/11/28 |
| 405165751 | * 7/1993 | (JP) | G06F/13/00 |

OTHER PUBLICATIONS

Helm & Maarek, "Integrated Information Retrieval and Domain Specfic Approaches for Browsing and Retrieval In Object Oriented Class Libraries", OOPSLA–ACM, pp. 47–61, 9/92.

(List continued on next page.)

*Primary Examiner*—James P. Trammell
*Assistant Examiner*—Kelvin Booker
(74) *Attorney, Agent, or Firm*—Sawyer Lawyer Group LLP

(57) ABSTRACT

The invention provides a technique for generating minimal debugging type information in a distinguished compile unit while still supporting the debugging of classes for which the distinguished compile unit is not, in this module, being built or debugged, where the debugging information for the classes has been previously compiled into one or more object modules. On detecting a reference to a type in a program, the compiler inserts code into the module it is compiling to direct the linker where to locate the debugging information object module describing that type. Usually, the object module will be located in a separate link library, so the compiler directs the linker to add the debug library to the list of libraries from which it tries to resolve symbolic references, and to add a reference to an external linkage symbol defined in the object module describing the type. The linker will have to resolve this symbol by adding the debug library into the link.

15 Claims, 3 Drawing Sheets

OTHER PUBLICATIONS

Kiczales & Lamping, "Issues In The Design and Specification of Class Libraries", OOPSLA–ACM, pp. 435–451, 6/95.

Gotwals et al "pC ++/Streams: A Library for I/O On Complex Distributed Data Structures", PPOPP–ACM, pp. 11–18, 5/91.

IBM Corporation; "Linking Program Modules on a Stack Microprocessor". IBM Technical Disclosure Bulletin, pp. 4528, May 1977.*

IBM Corporation; "Overlay Linker and Loader Process". IBM Technical Disclosure Bulletin, pp. 5615–5620, May 1986.*

IBM Corporation; "Method to Intercept Dynamically Loaded Subroutine Calls on the IBM RISC System/6000 AIX Operating System". IBM Technical Disclosure Bulletin, pp. 382–387, Mar. 1992.*

IBM Corporation; "Automatically Generating Formatted Documentation for Object–Oriented Class Libraries". IBM Technical Disclosure Bulletin, pp. 375–378, Dec. 1994.*

Yourst. Inside Java Class Files. Dr. Dobb's Journal. vol. 23, No. 1. Abstract, Jan. 1998.*

* cited by examiner

MINIMIZING DEBUG INFORMATION FOR GLOBAL TYPES IN COMPILED LANGUAGES

CROSS-REFERENCE TO RELATED APPLICATIONS

The present invention is related to U.S. patent application Ser. No. 08/992,876, entitled "A BINARY LIBRARY WITH DEBUGGING SUPPORT," filed Dec. 17, 1997, and assigned to the assignee of the present application.

FIELD OF THE INVENTION

The present invention is directed to an improved technique for providing minimal debugging information in an efficient compilation time.

BACKGROUND OF THE INVENTION

Object-oriented programs are programs written in programming languages such as C++ that support a particular form of user-defined data types called "classes". A class "declaration" in the programming language specifies the data contained by variables of the class type, or operations supported by those variables, or both. Variables or instances of these class types are called objects.

A feature of C++ programming, and similar object oriented languages, is that its classes are stored in separate files, often grouped together into libraries. The source code that defines a class is commonly separated into a declaration part, contained in a "header file", and an implementation part, contained in a "body file". The header files contain important preprocessor directives; the preprocessor directive #include permits the header file to be referred to by the body file, after which declarations in the header file may be used in the body file. A header file will be referenced by its corresponding body file, but may also be referenced by one or more other body files that make use of the defined class.

A compiler converts the source language contained in a body file, plus all referenced header files, into an object module file containing machine code. An executable program is formed by a linker or linking loader which combines the object modules generated from several body files, and in doing so, resolves references from one object module to symbols representing subroutines and data definitions found in another.

While some errors in programs are so fundamental that they halt compilation, more often logical errors prevent the program from producing the results expected. Therefore, modern compiler suites generally include a software tool called a debugger that can be used to diagnose the program and trace these errors. To support the debugger, the compiler, under the control of an option, produces information describing the symbols and types in the program as well as information to map between source lines and the binary code output. This extra information enables the programmer to examine the types, variables and data structures by name and to follow the execution of the program through the source code. Current compilers, such as IBM's VisualAgeJ C++ for OS/27 Version 3.0, generate debug information in the following naive fashion. For every type referenced in the source for the compilation unit, a full description of that type is provided in the debug type information that is included in the resulting object module. If the same type is referenced in multiple body files, then a copy of that type description will be generated in each of the object modules. This duplication results from the fact that the compiler processes the body files one at a time, and therefore does not know whether a needed type description will be generated in some other object module. Because of the size of the debug information, this duplication can result in massive executable module sizes where the size of the debug information dwarfs all other aspects of the module. In addition, significant compile resources (time, working set, etc.) are devoted to the creation of this debug information so that widespread duplication represents a large degradation in the compile time needed to build the executable module.

The prior art contains two approaches to ameliorating the module size and compile time problems.

One approach is to enhance the linker (or create a post link utility) to determine when multiple local type descriptions from different object modules are describing the same type and create a single global version of the type description (Global refers to the fact that it is accessible beyond the scope of a single object module's debug information). The link utility eliminates the duplicate local type descriptions and remaps all references to the global version of the type description. This approach solves the executable module size problem, but the object module size problem remains. Also, the compile time problem may actually be exacerbated by the link time cost of packing the debug type information.

The second approach is to enhance the compiler to emit full type descriptions only in the "distinguished compile unit" for that type. A heuristic commonly used to select a distinguished compile unit for a class is described in The Annotated C++ Reference Manual by Ellis & Stroustrup, 1990. The compile unit that contains the implementation of the lexically first non-inline virtual function member in that class is used as the distinguished compile unit. In other compile units that must reference the type that is fully described in the distinguished compile unit, a degenerate description of the type is emitted. The degenerate reference is a debut type record that does not describe the type but does provide a unique identifier for the type. By relying on the single definition rule in C++ the debugger and/or the linker is able to replace references to the incomplete type with references to the full type description.

While this technique solves the compiler time and disk space problems, it is unable to handle a very common class of applications, those that use binary class libraries or classes implemented in code (dll files) that are dynamically linked without debugging information. Since the prior art method depends on emitting the full type information only in the distinguished compile unit for the type, it cannot produce a debuggable application when the source code of the distinguished compile unit is not part of the user's build process.

Class libraries currently shipped in binary do not usually include debugging information with them because their producers assume that the header files shipped with the libraries provide enough information to build debugging information using a standard compiler and debugger. Furthermore, full debug information for the library source that could be used in compiling debugging information for an application would not be limited to the information required to describe types. The source information would expose other information about the implementation of the class library that producers could be unwilling to make generally available to customers in the absence of source code licenses.

SUMMARY OF THE INVENTION

It is therefore an object of the present invention to provide a technique to improve compilation in avoiding the compilation of duplicate debugging information.

It is also an object of the present invention to provide a mechanism for emitting minimal debug type information in a distinguished compile unit while still supporting the debugging of classes for which the distinguished compile unit is not, in this module, being built and debugged.

Accordingly, in one aspect, the present invention provides a method for emitting unique debugging type information providing full debugging support for types implemented in a binary library class. During compilation, a directive to a linker is emitted to add a library containing an object file with the debugging type information. A reference to an external symbol defined in the object file is also emitted. Then, for each type, a full description of the type is emitted in the distinguished compile unit for that type, while degenerate descriptions for the type are emitted in other compile units. During linking, a debugging index packing tool is enabled. The reference to the external symbol is resolved by linking the object file. The degenerate descriptions are resolved to full descriptions of the type obtained from the library.

The invention also provides a compiler adapted to compile object oriented program debugging type information, including debugging type information for types implemented in a binary class library. This includes means to emit a full description of a type in a distinguished compile unit for the type and otherwise to emit degenerate descriptions of the type referenced in the program, means to direct a linker to add to its link libraries a library containing full debugging type information for the binary class library, and means to direct the linker to resolve the degenerate descriptions by accessing the library containing the full debugging type information for the binary class.

In a further aspect, the invention provides a computer program product that consists of a computer usable medium having new, useful and non-obvious combination of computer readable program code means embodied thereon to program a general purpose computer to perform the method steps set out above.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

As discussed above, conventional compilers either provide full debugging information for referenced classes, or debugging information is emitted for referenced classes only if compiling the "distinguished compile unit". If the header files contain material that is never referred to, no debugging information is generated for it.

According to the preferred embodiment of the present invention, an additional mode for compiling objects containing debugging information generates debugging information for all types whether they are referenced or not and regardless of whether the unit being compiled is the distinguished compile unit for that type.

To utilize this, the builder of a binary class library can:
i) create an object file containing all debug information for the full range of types implemented and exported in the class library; and
ii) modify the header files that describe the interface to users of the class library so that the debugging information created in i) above is always available whenever types implemented in the class library are referenced in the user's source code during compilation.

Figure 1:
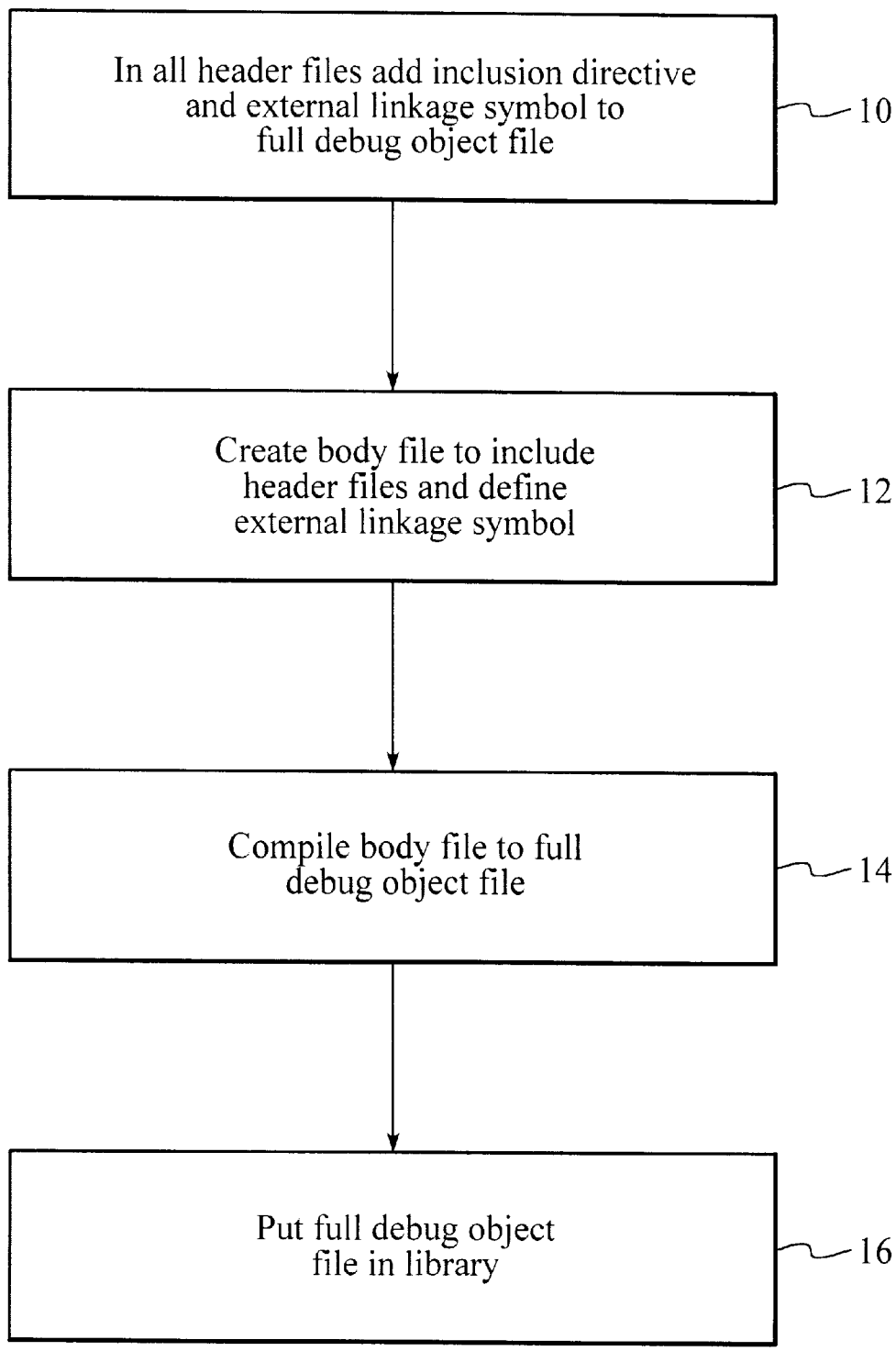
FIG. 1 is a flow diagram illustrating steps that could be taken by a class library builder or by a user of the class library for creating an object module containing full debugging information for all types in a library.

This is the subject of our concurrently-filed U.S. patent application titled A BINARY CLASS LIBRARY WITH DEBUGGING SUPPORT Ser. No. 08/992,876. A preferred method for achieving this is illustrated in the flow diagram of FIG. 1 and discussed below.

First, in block 10, all header files in the class library that describe the interface to users of the class library, are modified by adding a source text to cause the compiler to direct a linker toward a library with the object module containing full debugging information for the class library and to create a reference to an external symbol defined in the object module. This source could be:
i) a pragma that will direct the linker to add the static link library containing the object module with the full debug type information for the types implemented in the class library into the link whenever the header file is included in the user's source; and
ii) a reference to an externally defined symbol (to be defined in the object containing the full debug information) that will force the linker to add the object file containing the full debug information.

For example, in a C++ class library of the preferred embodiment, inserting the following code fragment into each header file will accomplish the desired result:
if defined (__MIN_DEBUG__)
pragma library(dbuginfo.lib)
pragma reference(ClassLibraryTypeInfo)
endif In this code fragment, __MIN_DEBUG__ is a macro that is reserved by the compiler and defined when the minimized debugging information mode is activated.

The "#pragma library" line causes the compiler to embed a control directive in the object module which in turn directs the linker to add a library (dbuginfo.lib, in this case) to the list of libraries from which it tries to resolve symbolic references. The added library would contain the object module where the full debug information can be found.

The pragma reference directs the compiler to put a reference to the named symbol (ClassLibraryTypeInfo, in this case) into the object module so that the linker will be forced to include the debug object which defines that symbol, in order to satisfy the reference.

Second, a body file is created to #include the header files and to declare and initialize the external linkage symbol (called ClassLibraryTypeInfo in the code fragment set out above) referenced in the header files (block 12). The body file is compiled using the option in the compiler for producing full debugging information, the option that creates type descriptions for types even if they are not referenced (block 14).

The resulting object module is put into a static library named to agree with the name given in the #pragma library()

statement of the code fragment (block 16). This can be an existing link library or a separate link library, at the discretion of the provider of the binary class library.

Once the full object debug file is accessible, the minimum debug feature of the present invention can be implemented.

According to the method of the invention, when the compiler is compiling the header files that describe the classes in the class library in the minimum debug mode, it will compile the #pragma library() and pragma reference statements. The compiler will then put directives in the object module that tell the linker to find dbuginfo.lib and to resolve a reference to the symbol ClassLibraryTypeInfo. When the linker processes the object so produced, it will be forced to add the object module containing the full debug information to the link.

Figure 2:
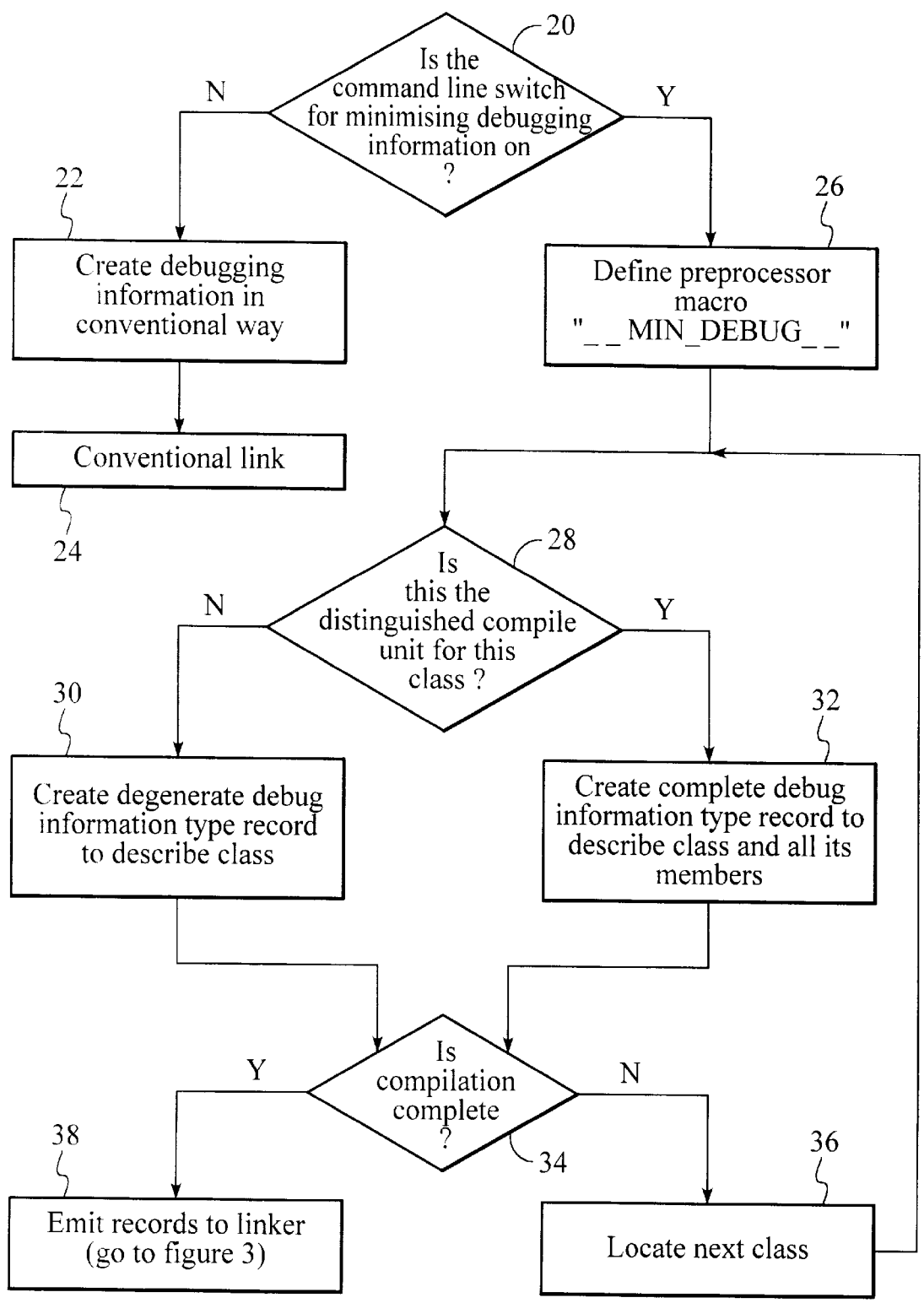
FIG. 2 is a flow diagram illustrating the steps taken in the compiler to generate minimal debugging information to the linker, according to the preferred embodiment of the invention.

This is illustrated in the flow diagram of FIG. 2.

The compiler is enhanced to operate in the minimum debugging mode on detecting the command line switch (block 20). In the absence of that, it will compile debugging code in the conventional manner discussed above, emitting type information in each compile unit that refers to that type (block 22). The link will also be according to convention (block 24); since there are no references to the debugging information library for the class library nor to any symbol that is defined in that library, the link does not result in errors and all debugging information comes from the objects themselves.

When the switch for implementing minimum debugging information is detected (block 20), the compiler first defines the preprocessor macro __MIN_DEBUG__ (block 26). Because this macro symbol is defined, the code fragment added to each header file by the class library builder causes a reference to "ClassLibraryTypeInfo" to be added to each module created by the compiler that includes one of these header files, and a directive is passed to the linker, via the object module, to make it add the "dbuginfo.lib" library to its list of default libraries in the link. The references to "ClassLibraryTypeInfo" are satisfied by the linker when it brings in the object module containing the complete debug information descriptions for the class library (built by the class library builder as described in FIG. 1) which also contains the definition of the symbol "ClassLibraryTypeInfo".

For teach reference to a class in the program, the compiler determines whether the module it is compiling is the distinguished compile unit for the class (block 28, FIG. 2). If it is not, the compiler generates only degenerate debug information type records (degenerate references) to describe the class (block 30). If the class is the distinguished compile unit, the compiler creates complete debug information records to describe the class and all its members (block 32).

Figure 3:
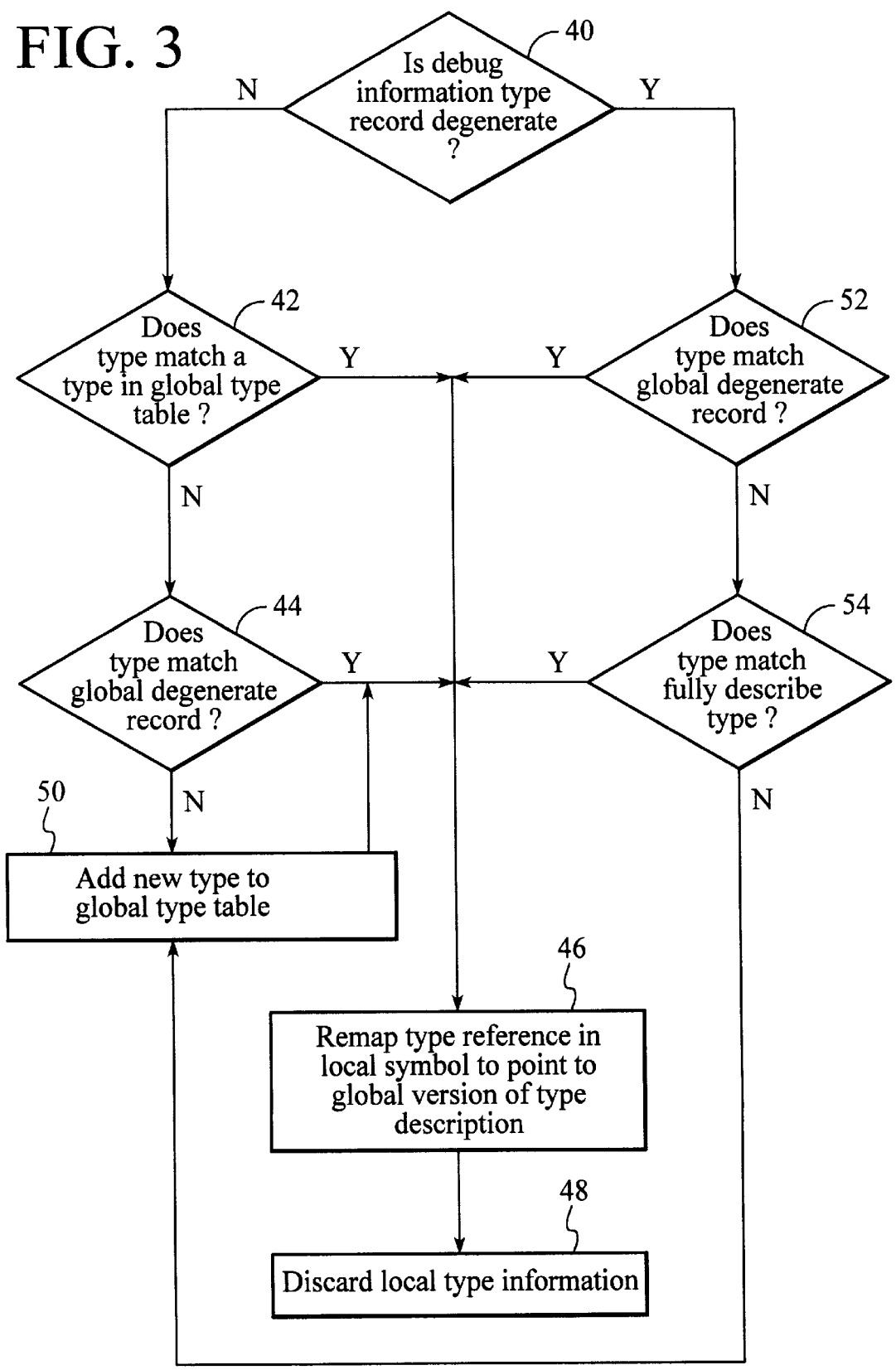
FIG. 3 is a flow diagram illustrating the steps taken in the linker to generate a single set of comprehensive debugging information from the minimal debugging information records provided by the compiler using debugging information provided with a class library, according to the preferred embodiment of the invention.

This process continues (blocks 34, 36) until the compilation is complete and the records are emitted to the linker (block 38). The debug packing feature in the linker matches up the degenerate references to types in the compile units with the full descriptions of those types found in the full debug object module, following the steps illustrated in FIG. 3.

Once the debug type index packing tool has been enabled to link time, the linker examines each type record in the debug type information to determine whether the record is degenerate (block 40).

Where the debug information type record is not a degenerate record, it must be matched to a global type (block 42). To match the record to a global type, either a match of the parent type (i.e., class) and all sibling records or a match of the parent to a global degenerate record must be located (block 44). If the match is successful, the type references are remapped in local symbols to point to the global version of the type description (block 46) and the local type descriptions are discarded (block 48).

If the match is not successful, a new type must be added to the global variable table (block 50) so that the local references can be remapped from the local type to use the global type instead (block 46, 48).

Where the debug information type record is a degenerate reference, a match to a global type must be located, either to match to a global degenerate type record of the same name and type (block 52) or to a fully described type with the same type and name (block 54). If the match is successful, then the type reference in the local symbol is remapped to point to the global version of the type description (block 46) and the local symbol is discarded (block 48). If not, then a new type must be added to the global type table (block 50) so that the local symbol can be remapped to a global version and the local type description discarded (blocks 46, 48).

The resulting executables and objects containing debugging information are of minimum size, and the compilation cost of producing the debugging information is drastically reduced.

In order to demonstrate these advantages of the use of the present invention, a simple test was conducted. A directory containing six pre-compiled object modules with a number of header files from a visual building tool was built in an IBM OS/2 system (50 MHz 486 24 MB).

The first test build was done without any debugging information being compiled currently, to establish a calibration.

| Test 1: | | |
|---|---|---|
| Start | 17:33:23 | |
| End | 17:35:21 | |
| Duration | 1:58 seconds | |
| 5:33 pm | 18061 bytes | A.obj |
| 5:33 pm | 6418 | B.obj |
| 5:34 pm | 4963 | C.obj |
| 5:34 pm | 38569 | D.obj |
| 5:35 pm | 9739 | E.obj |
| 5:35 pm | 1953 | F.obj |
| 6 files | 79703 bytes used | |

The second test build was performed with the conventional debugging information option activated.

| Test 2: | | |
|---|---|---|
| Start | 17:35:22 | |
| End | 17:37:48 | |
| Duration | 2:26 seconds | |
| 5:35 pm | 118750 bytes | A.obj |
| 5:36 pm | 72639 | B.obj |
| 5:36 pm | 41719 | C.obj |
| 5:36 pm | 219691 | D.obj |
| 5:37 pm | 109410 | E.obj |
| 5:37 pm | 26131 | F.obj |
| 6 files | 588340 bytes used | |

In the third build, the minimum debugging option of the present invention was activated.

| Test 3: | | |
|---|---|---|
| Start | 17:37:49 | |
| End | 17:39:51 | |
| Duration | 2:02 seconds | |
| 5:38 pm | 49238 bytes | A.obj |
| 5:38 pm | 25241 | B.obj |
| 5:38 pm | 18201 | C.obj |
| 5:39 pm | 102882 | D.obj |
| 5:39 pm | 37052 | E.obj |
| 5:39 pm | 8605 | F.obj |

6 files   241219 bytes used

From the foregoing, it can be seen that the second build, using the conventional debug information compilation technique added 25% to build time and 640% to object size, while the minimum debug collection option of the present invention reduced the time increase to 4% and the object size increase to 200%.

As an alternative to the above described preferred embodiment, the library could be eliminated for any cases where the class library itself is only in one library file. However, this would not be as effective for an operating system, such as IBM's OS/2, in which support for both static and dynamic linking is required and where there would be a library for static linking and an import library for dynamic linking. Two copies of the large full debugging information would also be required.

Also, the reference could be implemented simply as:
    extern int ClassLibraryTypeInfo This could not be used, however, in a compiler that has been enhanced to remove false references to avoid drawing unnecessary objects into the link without further enhancement. For example, if the back end of the compiler has been modified to permit removal of references only where the code or data artifacts that make the references are also removed, then references having no code or data artifacts referring to them in the first place will not be removed. The reference cited above would have no code or data artifacts, and it would not be removed.

Further modifications to the invention that would be obvious to those skilled in the art are intended to be covered within the scope of the appended claims.

What is claimed is:

1. A method for providing debugging information for a plurality of types in an object-oriented computer programming system, the method comprising the steps of:
    providing a class library for the at least one type of the plurality of types, the class library capable of being dynamically linked without full debugging information;
    providing a control directive to a linker to add a library containing an object module with the full debugging type information for the at least one type;
    providing a reference to an external symbol defined in the object module for the at least one type;
    providing a full description of the at least one type in a distinguished compile unit for the at least one type; and
    providing a degenerate description for the at least one type.

2. The method of claim 1 wherein each of the at least one type has a unique identifier and the degenerate description further includes a unique identifier of that type.

3. The method of claim 2 wherein each of the at least one type is a global type and the unique identifier includes a fully qualified type name for the global type.

4. The method of claim 2 further comprising the step of:
    linking the object module, the linking step further including the steps of:
        enabling a debugging type index packing tool;
        resolving the reference to the external symbol by linking the object module; and
        resolving the degenerate description to a full description for the at least one type obtained from the library.

5. The method of claim 2 wherein the at least one type further includes a type implemented in a binary class library.

6. A computer-readable medium containing a program for providing debugging information for a plurality of types, the program including instructions for:
    providing a control directive to a linker to add a library containing an object module with full debugging type information for the at least one type, the at least one type of the plurality of types being in a class library, the class library capable of being dynamically linked without full debugging information;
    providing a reference to an external symbol defined in the object module;
    providing a full description of the at least one type in a distinguished compile unit for the at least one type; and
    emitting a degenerate description for the at least one type.

7. The computer-readable medium of claim 6 wherein the program instructions further include instructions for:
    enabling a debugging type index packing tool;
    resolving the reference to the external symbol by linking the object module; and
    resolving the degenerate descriptions to full descriptions for the type obtained from the library.

8. The computer-readable medium of claim 7 wherein the at least one type further includes a type implemented in a binary class library.

9. A compiler adapted to compile object oriented programs and include debugging information for a plurality of types being compiled, the compiler comprising:
    means for providing a full description of the at least one type in a distinguished compile unit for the at least one type and otherwise emitting a degenerate description for the at least one type, the at least one type of the plurality of types being in a class library, the class library capable of being dynamically linked without full debugging information;
    means to direct a linker to add to a plurality of link libraries a library containing an object module including full debugging type information for the at least one type; and
    means to direct the linker to resolve the degenerate description by accessing the library containing the full debugging type information for the at least one type.

10. The compiler of claim 9 wherein the means to direct the linker further include:
    means to embed a control directive to the linker to add a library identified in a header file in a class library.

11. The compiler of claim 9 wherein the means to direct the linker to resolve the degenerate description further include:
    means for providing a reference to an external symbol defined in the library containing full debugging type information.

12. The compiler of claim 9 wherein the at least one type further includes a type implemented in a binary class library.

13. The method of claim 1 wherein the full description, the degenerate reference or both provide the full debugging type information for the class library through the object module, the control directive and the reference to the external symbol.

14. The computer-readable medium of claim 6 wherein the full description, the degenerate reference or both provide the full debugging type information for the class library through the object module, the control directive and the reference to the external symbol.

15. The system of claim 9 wherein the full description, the degenerate reference or both provide the full debugging type information for the class library through the object module, the control directive and the reference to the external symbol.

* * * * *